(12) United States Patent
Iwamoto et al.

(10) Patent No.: US 10,706,658 B2
(45) Date of Patent: Jul. 7, 2020

(54) VENDING MACHINE RECOGNITION APPARATUS, VENDING MACHINE RECOGNITION METHOD, AND RECORDING MEDIUM

(71) Applicant: NEC Corporation, Tokyo (JP)

(72) Inventors: Kota Iwamoto, Tokyo (JP); Kyota Higa, Tokyo (JP); Ruihan Bao, Tokyo (JP); Takami Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 138 days.

(21) Appl. No.: 15/521,268

(22) PCT Filed: Oct. 9, 2015

(86) PCT No.: PCT/JP2015/005150
§ 371 (c)(1),
(2) Date: Apr. 21, 2017

(87) PCT Pub. No.: WO2016/063483
PCT Pub. Date: Apr. 28, 2016

(65) Prior Publication Data
US 2017/0309113 A1    Oct. 26, 2017

(30) Foreign Application Priority Data

Oct. 21, 2014  (JP) .................................. 2014-214754

(51) Int. Cl.
*G06K 9/00* (2006.01)
*G07F 9/00* (2006.01)
(Continued)

(52) U.S. Cl.
CPC ........... *G07F 9/00* (2013.01); *G06K 9/00624* (2013.01); *G06K 9/00671* (2013.01); *G06K 9/50* (2013.01);
(Continued)

(58) Field of Classification Search
CPC .. G06K 9/00624; G06K 9/00671; G06K 9/50; G06K 2209/01; G07F 9/00;
(Continued)

(56) References Cited

U.S. PATENT DOCUMENTS 8,189,855 B2 *  5/2012  Opalach ............... G06Q 10/087
                                                  382/100
8,380,347 B2 *  2/2013  Garson .................. G07F 9/026
                                                  700/236
(Continued)

FOREIGN PATENT DOCUMENTS

JP    2012-53711       3/2012
JP    2013-250647     12/2013
(Continued)

OTHER PUBLICATIONS

International Search Report and Written Opinion dated Dec. 22, 2015, in corresponding PCT International Application.

*Primary Examiner* — Shefali D Goradia
(74) *Attorney, Agent, or Firm* — Finnegan, Henderson, Farabow, Garrett & Dunner, L.L.P.

(57) ABSTRACT

A vending machine recognition apparatus includes: a receiving unit configured to receive a captured image obtained by capturing an image of a vending machine; and a recognition unit configured to recognize merchandise from the captured image and recognize a price of the merchandise from a peripheral image region of an image region of the recognized merchandise.

12 Claims, 9 Drawing Sheets

(51) Int. Cl.
  *G07F 9/02* (2006.01)
  *G06K 9/50* (2006.01)
  *G06Q 20/20* (2012.01)
(52) U.S. Cl.
  CPC ......... *G06Q 20/201* (2013.01); *G06Q 20/208* (2013.01); *G07F 9/006* (2013.01); *G07F 9/026* (2013.01); *G06K 2209/01* (2013.01)
(58) Field of Classification Search
  CPC ....... G07F 9/006; G07F 9/026; G06Q 20/201; G06Q 20/28
  See application file for complete search history.

(56) References Cited

U.S. PATENT DOCUMENTS

| | | | | |
|---|---|---|---|---|
| 8,873,794 | B2* | 10/2014 | Sorensen | G06K 9/00771 382/100 |
| 9,262,377 | B2* | 2/2016 | Garson | G07F 9/026 |
| 2006/0283941 | A1* | 12/2006 | Singer-Harter | G06Q 30/02 235/383 |
| 2008/0043013 | A1* | 2/2008 | Gruttadauria | G06Q 30/02 345/419 |
| 2008/0249658 | A1* | 10/2008 | Walker | G07F 9/02 700/236 |
| 2009/0182630 | A1* | 7/2009 | Otto | G06Q 20/20 705/14.1 |
| 2010/0237091 | A1* | 9/2010 | Garson | G07F 9/026 221/226 |
| 2011/0143779 | A1* | 6/2011 | Rowe | G06Q 30/02 455/456.3 |
| 2012/0265744 | A1* | 10/2012 | Berkowitz | G06F 17/30873 707/705 |
| 2013/0325533 | A1* | 12/2013 | Shin | G06Q 30/06 705/7.12 |
| 2014/0195302 | A1* | 7/2014 | Yopp | G06Q 10/047 705/7.33 |
| 2014/0316560 | A1* | 10/2014 | Hoormann | G07F 9/023 700/232 |
| 2015/0310411 | A1* | 10/2015 | Lindfeldt | G06Q 20/32 705/21 |

FOREIGN PATENT DOCUMENTS

| | | |
|---|---|---|
| JP | 2014-44480 | 3/2014 |
| JP | 2014-149226 | 8/2014 |

* cited by examiner

VENDING MACHINE RECOGNITION APPARATUS, VENDING MACHINE RECOGNITION METHOD, AND RECORDING MEDIUM

CROSS-REFERENCE TO RELATED PATENT APPLICATIONS

This application is a National Stage Entry of International Application No. PCT/JP2015/005150, filed Oct. 9, 2015, which claims priority from Japanese Patent Application No. 2014-214754, filed Oct. 21, 2014. The entire contents of the above-referenced applications are expressly incorporated herein by reference.

TECHNICAL FIELD

The present invention relates to a vending machine recognition apparatus, a merchandise shelf recognition apparatus, a vending machine recognition method, a recording medium, and an image processing apparatus.

BACKGROUND ART

In stores, vending machines, and the like that sell merchandise, a work for collecting merchandise information of merchandise being sold is performed in order to grasp a sales situation as marketing. There are numerous stores and vending machines, and therefore, there has been a problem that a work cost and a work time are needed when the merchandise information is manually collected. Therefore, a method for automatically collecting such merchandise information using an image captured by a camera has been desired.

PTL1 describes an apparatus that collates captured image data with image data of a plurality of articles previously stored.

CITATION LIST

Patent Literature

PTL 1: Japanese Laid-open Patent Publication No. 2014-44480

SUMMARY OF INVENTION

Technical Problem

For example, for automatically collecting merchandise information such as merchandise being sold and a price of the merchandise in a vending machine not being managed, it is conceivable that the merchandise information is collected using an image obtained by image captured the vending machine.

However, in the technique of PTL 1, character information written on a surface of the merchandise is merely read. Therefore when a price of the merchandise in a vending machine, for example, is not written in the merchandise itself, it is impossible to automatically collect the price of the merchandise.

Further, in the technique of PTL 1, a price of merchandise is previously registered on a database as attribute information included in partial feature information of the merchandise, and the attribute information is used for a collation target of an article. In this manner, due to the technique of PTL 1, prices of pieces of merchandise is collected to use as information for collating merchandise. However, collecting a price at which collated merchandise is being sold is not disclosed. Therefore, it is difficult to collect information of a price or the like of merchandise being sold by a vending machine not being managed, using the technique of PTL 1.

The present invention has been made in view of the above-described issue, and an object of the present invention is to provide a technique capable of more favorably collecting merchandise information of merchandise being sold.

Solution to Problem

To solve the above-described issues, a vending machine recognition apparatus according to one aspect of the present invention includes: receiving means for receiving a captured image obtained by capturing an image of a vending machine; and recognition means for recognizing merchandise from the captured image and recognizing a price of the merchandise from a peripheral image region of an image region of the recognized merchandise.

A merchandise shelf recognition apparatus according to one aspect of the present invention includes: receiving means for receiving a captured image obtained by capturing an image of a merchandise shelf where merchandise is displayed; and recognition means for recognizing merchandise from the captured image and recognizing a price of the merchandise from a peripheral image region of an image region of the recognized merchandise.

A vending machine recognition method according to one aspect of the present invention includes: receiving a captured image obtained by capturing an image of a vending machine; recognizing merchandise from the captured image and recognizing a price of the merchandise from a peripheral image region of an image region of the recognized merchandise.

An image processing apparatus according to one aspect of the present invention includes: receiving means for receiving a captured image obtained by capturing an image of an object indicating displayed merchandise; and recognition means for recognizing predetermined merchandise from the captured image and recognizing information relating to the merchandise from a peripheral image region of an image region of the recognized merchandise.

A computer program for realizing the above-described apparatuses, or method by a computer and a computer-readable recording medium storing the computer program are also included in the scope of the present invention.

Advantageous Effects of Invention

According to the present invention, it is possible to more favorably collect merchandise information of merchandise being sold.

EXAMPLE EMBODIMENT

First Example Embodiment

A first example embodiment of the present invention will be described in detail with reference to the drawings. In the present example embodiment, information for describing merchandise (article) being sold, and is the information being associated with the merchandise, is referred to as merchandise information. The merchandise information includes, for example, identification information for identifying merchandise such as a merchandise name and accompanying information associated with the merchandise. The accompanying information of merchandise includes, for example, a price of merchandise and information indicating a situation (a sales situation) where the merchandise is being sold. The information indicating a sales situation of merchandise is, for example, information indicating whether the merchandise is cold merchandise or hot merchandise. The accompanying information of merchandise is not limited to this and may include information indicating whether merchandise is being sold or is sold out. The information indicating a sale situation of merchandise may be formed with a character string, a color, or a shape.

Figure 1:
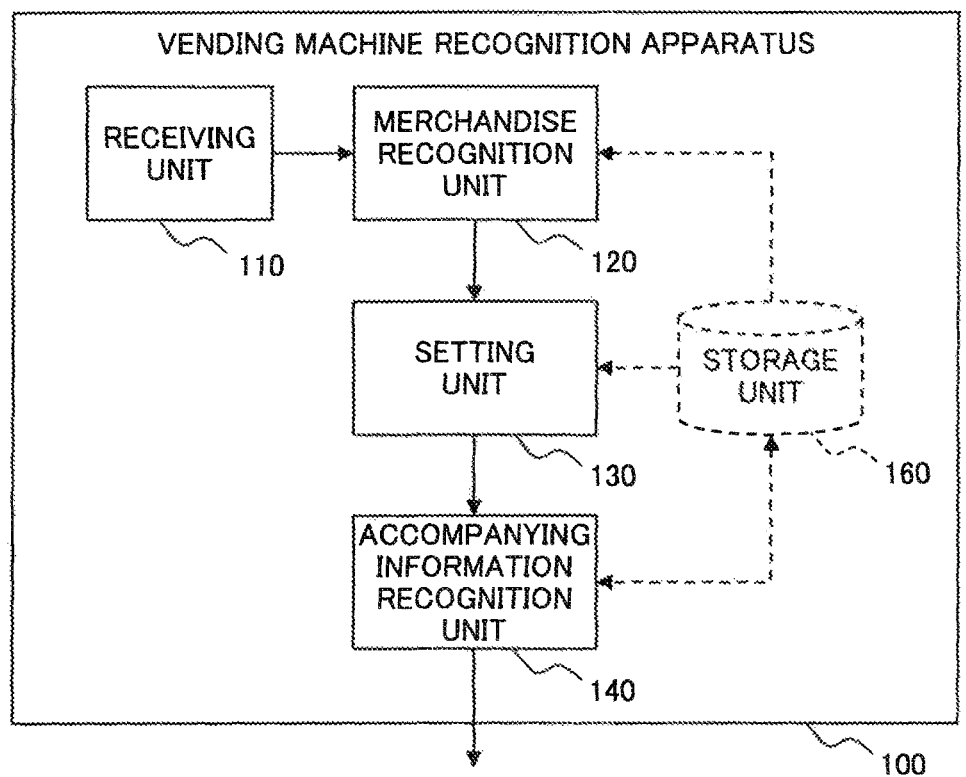
FIG. 1 is a function block diagram illustrating one example of a function configuration of a vending machine recognition apparatus according to a first example embodiment of the present invention.

With reference to FIG. 1, a vending machine recognition apparatus according to the present example embodiment will be described. FIG. 1 is a function block diagram illustrating one example of a function configuration of a vending machine recognition apparatus 100 according to the present example embodiment. As illustrated in FIG. 1, the vending machine recognition apparatus 100 includes a receiving unit 110, a merchandise recognition unit 120, a setting unit 130, and an accompanying information recognition unit (also simply referred to as a recognition unit) 140. The vending machine recognition apparatus 100 may further include a storage unit 160. It goes without saying that the vending machine recognition apparatus 100 illustrated in FIG. 1 is illustrated with a configuration specific to the present example embodiment, and may include a member that is not illustrated in FIG. 1. A direction of an arrow in the drawing represents one example and does not limit a direction of a signal between blocks. Also in another block diagram to be referred to later, in the same manner, a direction of an arrow in a corresponding drawing will represent one example and does no limit a direction of a signal between blocks.

The receiving unit 110 is a means configured to receive a captured image obtained by capturing an image of a vending machine to be a target in which merchandise is recognized. The captured image is, for example, an image captured by an imaging device such as a camera.

The receiving unit 110 receives the captured image from, for example, an imaging device. A method in which the receiving unit 110 receives a captured image is not specifically limited. The receiving unit 110 may receive a captured image from, for example, an imaging device connected to the vending machine recognition apparatus 100 using a USB (Universal Serial Bus) cable or the like. Further, the receiving unit 110 may receive a captured image from, for example, an imaging device connected to the vending machine recognition apparatus 100 via a network.

The receiving unit 110 may receive a captured image from, for example, a storage device on which captured images are accumulated. The receiving unit 110 may receive, together with a captured image, position information indicating a position where the captured image has been captured.

In the present example embodiment, a vending machine to be a target for image capture may include, in a transparent panel of a front side of a housing thereof, a shelf where objects (e.g., merchandise samples) indicating a plurality of pieces of merchandise are displayed. In the present example embodiment, a vending machine to be a target for image capture may display images indicating a plurality of merchandise on a display. A method in which a vending machine indicates merchandise to be sold is not specifically limited.

Figure 2:
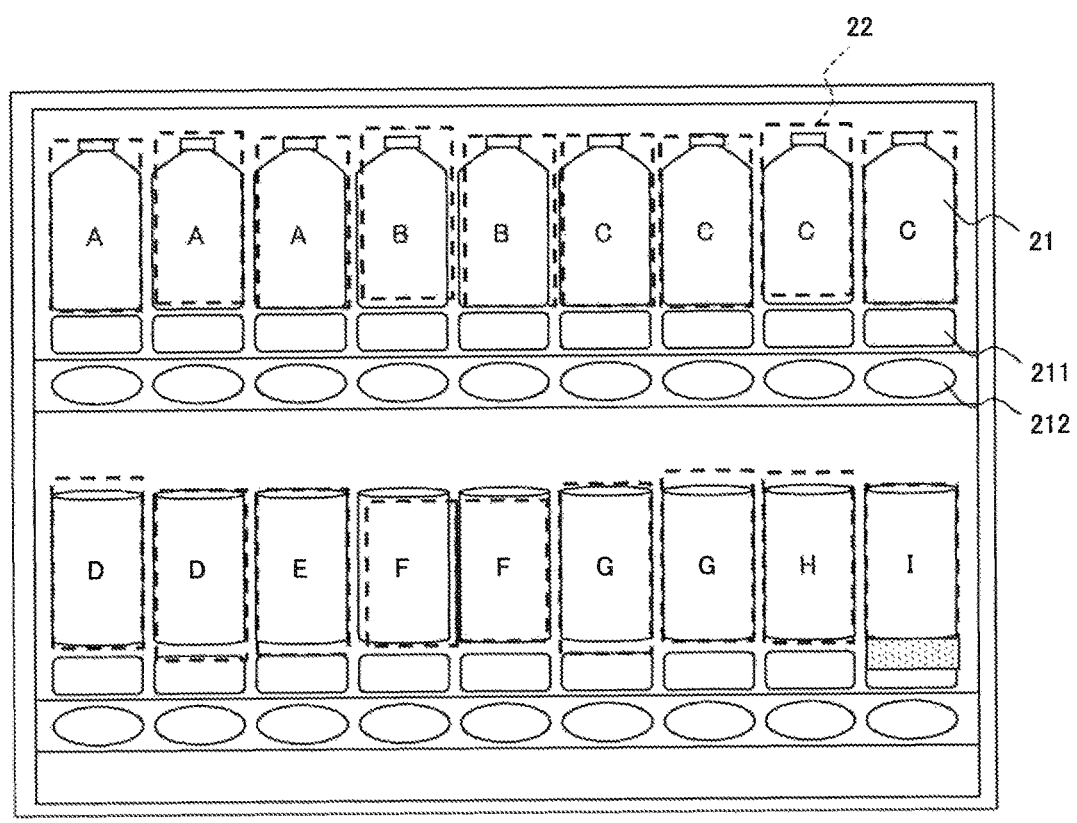
FIG. 2 is a diagram for illustrating one example of a captured image received by the vending machine recognition apparatus according to the first example embodiment of the present invention.

FIG. 2 illustrates one example of a captured image used in the present example embodiment. FIG. 2 is a diagram for illustrating one example of a captured image received by the vending machine recognition apparatus according to the present example embodiment. As illustrated in FIG. 2, a captured image includes an image of a plurality of merchandise samples 21. The captured image includes, in association with each merchandise sample 21, an image of a portion (211) indicating a price of merchandise identified by the merchandise sample 21 and an image of a button (212) for purchasing the merchandise, for example. The merchandise sample 21 indicates merchandise being sold by a vending machine including the merchandise sample 21. Hereinafter, an image of the merchandise sample 21 will also be referred to as a merchandise image. In FIG. 2, an alphabet in each piece of merchandise 21 is assumed to represent a merchandise name.

In the present example embodiment, it is assumed that the captured image is an image obtained by capturing image of one vending machine, but the captured image may be an image obtained by capturing image of a plurality of vending machines. The captured image may be an image obtained by capturing image of a part of one vending machine.

The receiving unit 110 supplies the received captured image to the merchandise recognition unit 120.

The storage unit 160 stores information for recognizing merchandise indicated by the merchandise sample 21 included in the captured image. Specifically, the storage unit 160 stores an image of merchandise or a merchandise sample and/or a feature included in the image of the merchandise or the merchandise sample, in association with information (e.g., an identifier for identifying merchandise or a merchandise name) for identifying the merchandise.

The information stored in the storage unit 160 may be information necessary to recognize the merchandise.

The storage unit 160 stores character data used upon character recognition. The character data is stored for each font. The accompanying information recognition unit 140 to be described later collates the character data with extracted character information and thereby performs character recognition. The character data stored in the storage unit 160 may be data used upon character recognition, and a type of the data is not specifically limited.

The storage unit 160 may store information relating to a condition of a vending machine to be a target for merchandise recognition (a vending machine that is an image capture target). Hereinafter, the vending machine to be a target for merchandise recognition will be referred to as a target vending machine. In addition, the information relating to a condition of a vending machine will be referred to as vending machine condition information. The vending machine condition information may include, for example, information indicating a condition related to a price of merchandise dealt in by the vending machine and information relating to a condition where there is a character string, below the merchandise sample 21, indicating a price of merchandise indicated by the merchandise sample 21. The vending machine condition information is not limited to the above, and the storage unit 160 may include information indicating a location where a vending machine is installed. The information indicating the location may be received by the receiving unit 110.

Information for recognizing merchandise, character data, and vending machine condition information may be stored in the same storage device (e.g., the storage unit 160) or may be stored in different storage devices, respectively.

The storage unit 160 may be incorporated in the vending machine recognition apparatus 100 or may be realized by a storage device separate from the vending machine recognition apparatus 100.

The merchandise recognition unit 120 receives the captured image from the receiving unit 110. The merchandise recognition unit 120 refers to, information for recognizing merchandise stored in the storage unit 160 and recognizes, from the received captured image, a subject (the merchandise sample 21 in the present example embodiment) included in the captured image. Thereby, the merchandise recognition unit 120 recognizes merchandise which is a recognition target for the merchandise and is being sold by the vending machine.

In this case, the merchandise recognition unit 120 may segment, from the captured image, a local region including an image of the merchandise sample 21 and recognize merchandise using a plurality of features extracted from the segmented local region. The merchandise recognition unit 120 may recognize merchandise using a plurality of features extracted from the captured image, without segmenting a local region including a merchandise image. A method in which the merchandise recognition unit 120 recognizes merchandise is not specifically limited.

In FIG. 2, a frame of a dashed line (a merchandise image region 22) surrounding each merchandise sample 21 indicates an image region of the merchandise sample 21 recognized by the merchandise recognition unit 120. The merchandise recognition unit 120 outputs, to the setting unit 130 as a recognition result, information (e.g., a merchandise name) indicating the recognized merchandise and image region information indicating the merchandise image region 22 of the merchandise sample 21 associated with the merchandise. The image region information refers to, for example, position information of the merchandise image region 22 of the merchandise sample 21 within the captured image. In this case, the merchandise recognition unit 120 outputs the captured image by which merchandise has been recognized to the setting unit 130, together with the recognition result.

The setting unit 130 receives the recognition result and the captured image from the merchandise recognition unit 120. The setting unit 130 sets, on the captured image, a peripheral image region of the merchandise image region 22 indicated by the received image region information as a region (referred to as a recognition target region 23) where a price of merchandise associated with the merchandise image region 22 is recognized. The recognition target region 23 is a region for searching, from the above-described region, a character string indicating a price of merchandise and therefore is also referred to as a search region.

Figure 3:
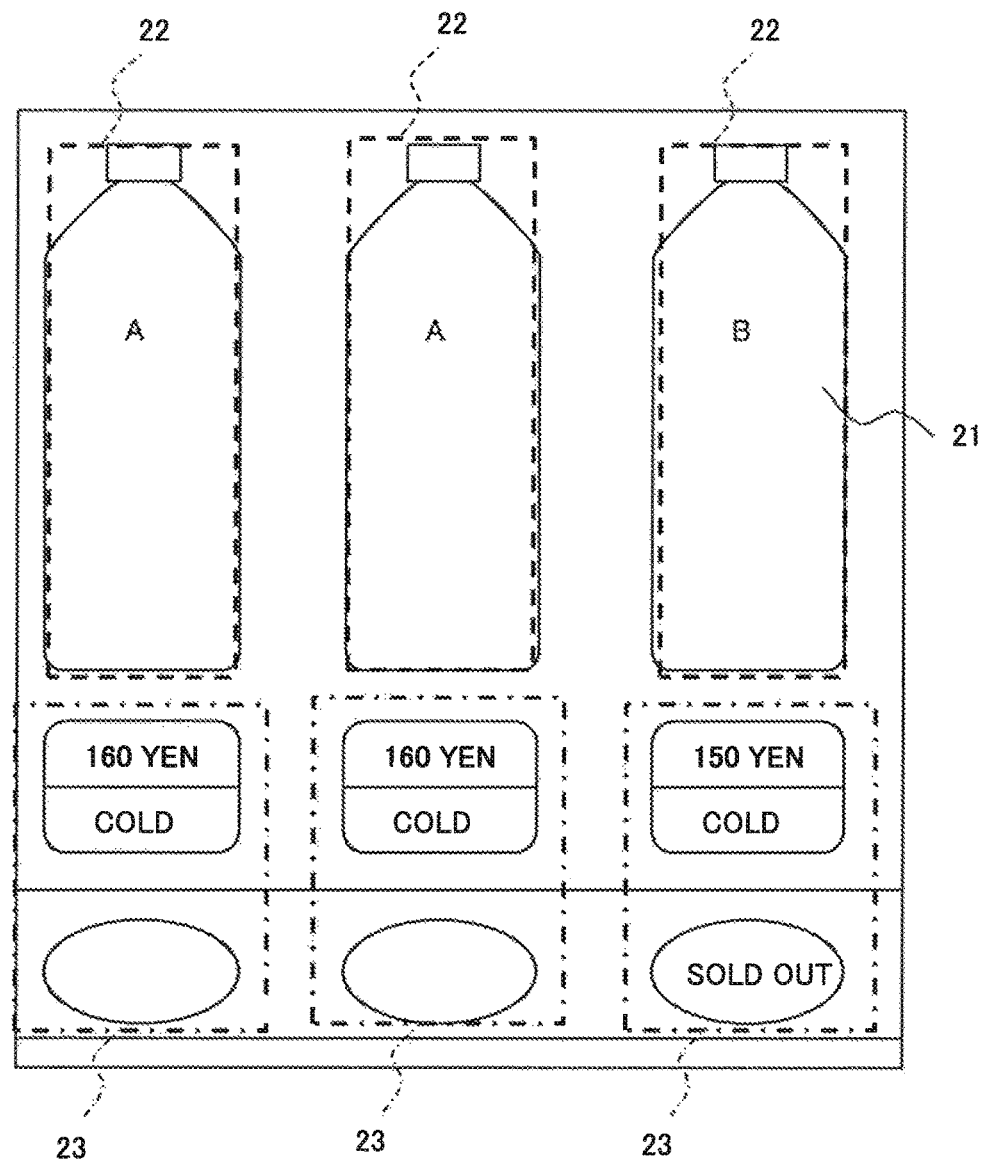
FIG. 3 is a diagram for illustrating a recognition target region in the first example embodiment of the present invention.

The recognition target region 23 set by the setting unit 130 will be described with reference to FIG. 3. FIG. 3 is one example of an image obtained by partially enlarging the captured image illustrated in FIG. 2 and is a diagram for illustrating a recognition target region. The setting unit 130 sets a peripheral image region of the merchandise image region 22 as the recognition target region 23. At that time, the setting unit 130 preferably sets the recognition target region 23 based on a predetermined condition. The predetermined condition is, for example, vending machine condition information stored in the storage unit 160. Description will be made on a case where the vending machine condition information is, for example, information indicating a condition where there is information (e.g., a character string), below the merchandise sample 21, indicating accompanying information such as a price of merchandise and the like indicated by the merchandise sample 21. In this case, the setting unit 130 sets, based on the condition, a region surrounded by a dashed-dotted line that is a region below the merchandise image region 22 as the recognition target region 23, as illustrated in FIG. 3. Thereby, the setting unit 130 may narrow down a region for recognizing accompanying information of merchandise indicated by the merchandise sample 21.

The setting unit 130 outputs an image of the set recognition target region 23 to the accompanying information recognition unit 140, in association with information indicating merchandise for which a price is recognized in the recognition target region 23. Information indicating merchandise to be associated with the image of the recognition target region 23 by the setting unit 130 is information received from the merchandise recognition unit 120 by the setting unit 130 as a recognition result.

The accompanying information recognition unit 140 receives, from the setting unit 130, the information indicating the merchandise recognized by the merchandise recognition unit 120 and the image of the recognition target region 23 associated with the information indicating the merchandise. The accompanying information recognition unit 140 recognizes accompanying information of the merchandise included in the image of the recognition target region 23. Description will be made by citing a price of the merchandise, as the accompanying information of merchandise.

The accompanying information recognition unit 140 recognizes a price of the merchandise, using an image of the recognition target region 23 associated with a certain piece of recognized merchandise. Specifically, the accompanying information recognition unit 140 extracts a character candidate from the image of the recognition target region 23. The accompanying information recognition unit 140 collates the extracted character candidate with character data stored in the storage unit 160 and thereby performs character recognition. The accompanying information recognition unit 140 associates the character recognition result with information indicating the merchandise associated with the image of the recognition target region 23 on which the character recognition has been performed. In other words, the accompanying information recognition unit 140 recognizes a price of merchandise indicated by received information indicating the merchandise and associates the merchandise with a price that is a character recognition result.

Thereby, the vending machine recognition apparatus 100 may more favorably collect merchandise information such as merchandise being sold and a price of the merchandise. The accompanying information recognition unit 140 may output information indicating merchandise and a price of the merchandise associated with each other to the outside of the vending machine recognition apparatus 100 or may store the information on the storage unit 160.

As illustrated in FIG. 3, letters included in a character string indicating a price are disposed side by side laterally in a row as in "160", for example. Therefore, it is preferable for the accompanying information recognition unit 140 to determine that recognized letters are not letters indicating a price when the letters recognized as numbers are not included in the line.

It is assumed that the accompanying information recognition unit 140 recognizes respective numbers included in a character string indicating a price (here, "160 yen" is cited as an example) as "1", "6", and "0". In this case, the "1", "6", and "0" are an aggregate of numbers continuously disposed side by side laterally in a row. Therefore, the accompanying information recognition unit 140 recognizes the "1", "6", and "0" of the recognized numbers as letters constituting the character string indicating the price.

Further, it is assumed that the accompanying information recognition unit 140 recognizes "0" and "D" of "COLD" indicating a cold beverage as "0 (zero)". In this case, the letters "0" and "D" recognized as "0" are not numbers continuously disposed side by side laterally in a row. Neither the "0" nor the "D" is included in a line (a predetermined line) constituting "160". Therefore, the accompanying information recognition unit 140 determines that the letters ("0" and "D") recognized as "0" are erroneously recognized letters.

From the above, the accompanying information recognition unit 140 recognizes the character string including "1", "6", and "0" constituting "160" as a price of the merchandise.

In price declaration, a key symbol (in the above-described example, "¥" or "yen") indicating that a written number is a price as in "¥100" or "120 yen" is frequently included in a periphery of the number constituting the price. The accompanying information recognition unit 140 may use this information and execute processing for recognizing (price recognition processing), as a price of merchandise, a number string written in a region continued toward a right side (or a left side) of "¥" (or "yen"), for example.

For example, the accompanying information recognition unit 140 recognizes a key symbol from the recognition target region 23. The accompanying information recognition unit 140 may further limit a right-side (or left-side) region of a key symbol as a recognition target region and execute the price recognition processing for the limited recognition target region.

The accompanying information recognition unit 140 previously recognizes, for example, all letters (including a key symbol) included in the recognition target region 23. It is possible that when a key symbol is included in the character recognition result, the accompanying information recognition unit 140 determines a price based on a recognition result of letters existing at a right side (or a left side) of the key symbol.

The accompanying information recognition unit 140 may reflect information relating to a sequence of letters in the character recognition result. For example, a height of numbers (e.g., "1", "3", and "0" in the case of a price declaration of "130") constituting a price of each piece of merchandise in a vending machine is likely to be substantially constant. Therefore, the accompanying information recognition unit 140 may consider the consistency of a height of recognized letters as one indicator in price recognition processing.

The accompanying information recognition unit 140 may execute price recognition processing, using information of a line where letters constituting a price are disposed. The letters constituting a price are frequently disposed at equal intervals in a lateral direction. For example, when a price of "100" and a price of "130" are written, an interval between the "100" and the "130" is larger than intervals of the respective letters of "1", "0", and "0" constituting "100". Therefore, the accompanying information recognition unit 140 may calculate a character interval in a lateral direction in a plurality of recognized numbers to execute control in such a way that a character string disposed in equal intervals is recognized as a price of merchandise. In this manner, the accompanying information recognition unit 140 may consider a character interval in a lateral direction as one indicator in price recognition processing.

The accompanying information recognition unit 140 may calculate a similarity degree (reliability level) or error rate in character recognition and use the reliability level or error rate to determine a price. For example, description will be made on a case in which the accompanying information recognition unit 140 recognizes two or more character strings constituting a price. In this case, the accompanying information recognition unit 140 calculates, for each character string, a reliability level (or error rate) for each of a plurality of numbers included in the character string. The accompanying information recognition unit 140 sets an average value of the reliability levels (or error rates) calculated for a plurality of numbers, respectively, included in a certain character string as the reliability level (or error rate) for the character string. In the same manner, the accompanying information recognition unit 140 sets, also for another character string, an average value of reliability levels (or error rates) calculated for a plurality of numbers, respectively, included in the another character string as a reliability level (or error rate) for the another character string. The accompanying information recognition unit 140 may recognize, from among two or more character strings constituting the price, a character string in which a set reliability level (or error rate) is maximum (minimum) as a price of related merchandise.

Thereby, it is possible for the accompanying information recognition unit 140 to more accurately recognize a price of merchandise.

(Regarding Operation Flow of Vending Machine Recognition Apparatus 100)

Figure 4:
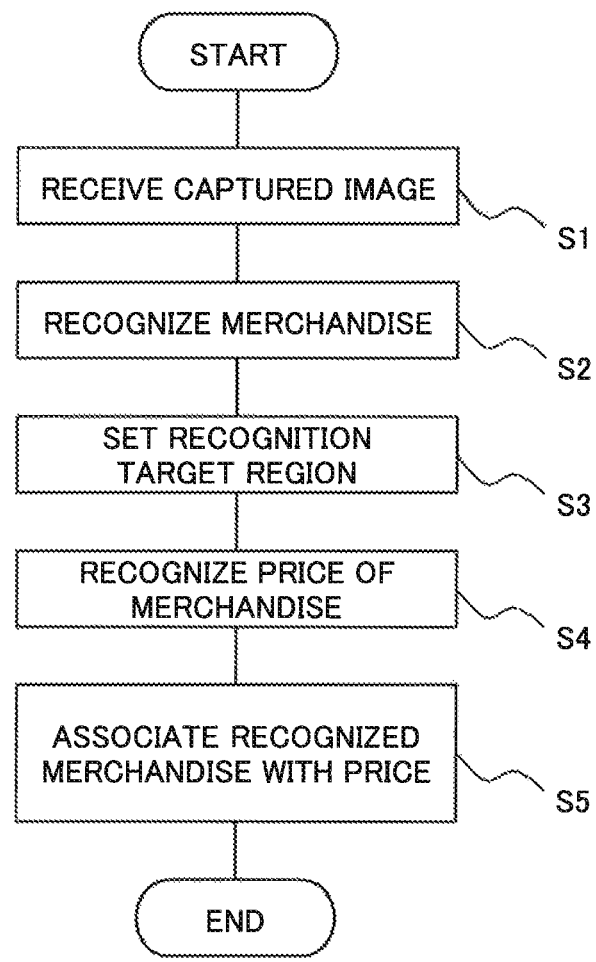
FIG. 4 is a flowchart illustrating one example an operation flow of the vending machine recognition apparatus according to the first example embodiment of the present invention.

Next, with reference to FIG. 4, an operation flow of the vending machine recognition apparatus 100 according to the present example embodiment will be described. FIG. 4 is a flowchart illustrating one example of the operation flow of the vending machine recognition apparatus 100 according to the present example embodiment.

First, the receiving unit 110 receives a captured image (step S1). The merchandise recognition unit 120 then recognizes merchandise included in the captured image received by the receiving unit 110 in step S1 (step S2).

The setting unit 130 sets, for each piece of merchandise recognized by the merchandise recognition unit 120, the recognition target region 23 of the merchandise (step S3). The accompanying information recognition unit 140 recognizes a price of merchandise associated with the recognition target region 23 in the recognition target region 23 set for each piece of merchandise in step S3 (step S4).

The accompanying information recognition unit 140 associates the price recognized in step S4 with the merchandise recognized by the merchandise recognition unit 120 in step S2 (step S5). Through the above processing, the vending machine recognition apparatus 100 can collect, from a captured image, merchandise information of merchandise being sold in a vending machine.

Description will be made on a case in which the recognition target region 23 is set based on a condition where there is information, below the merchandise sample 21, indicating accompanying information such as a price of merchandise indicated by the merchandise sample 21. In this case, the accompanying information recognition unit 140 may lower a threshold for character recognition in the recognition target region 23 until character recognition is performed and then perform the character recognition. The threshold for character recognition refers to a value of a border of whether the accompanying information recognition unit 140 recognizes that letters included in character data and letters of a recognition target are the same when recognizing letters, and also refers to a value of a similarity degree of recognition. Thereby, it is possible for the vending machine recognition apparatus 100 to more reliably collect a price of merchandise.

The accompanying information recognition unit 140 may recognize a price of merchandise based on information relating to a price of merchandise being sold in a vending machine. Merchandise being sold in the vending machine generally has "0" at a first digit. Therefore, the accompanying information recognition unit 140 executes character recognition based on information relating to a price of such merchandise, and then the accompanying information recognition unit 140 determines that the recognition result is erroneous recognition when recognizing numbers with a number other than "0" at a first digit. The accompanying information recognition unit 140 executes character recognition again. At that time, the accompanying information recognition unit 140 may change a recognition parameter set upon executing character recognition.

The information relating to a price of merchandise is not limited to the above, and may be information indicating a price zone (an upper-limit price and a lower-limit price, or the like) of merchandise being sold in a vending machine, for example. In this case, the accompanying information recognition unit 140 determines that the recognition result is erroneous recognition when recognizing a price that is not included in the price zone, and executes character recognition again.

The information relating to a price of merchandise may be information indicating a digit number. For example, a character string (excluding a key symbol) of a price portion (a number portion) of a vending machine selling beverages is likely to have two digits or three digits. Therefore, the accompanying information recognition unit 140 may execute character recognition based on information relating to a price of such merchandise and limit the recognition target region 23 (alternatively, select a character recognition result) so that a digit number included in the recognition result is two digits or three digits. Thereby, the accompanying information recognition unit 140 may enhance accuracy in recognition of merchandise information of merchandise.

A vending machine may also sell a plurality of pieces of merchandise having the same merchandise name disposed side by side. The merchandise having the same merchandise name are being sold at the same price. Therefore, when the captured image includes a plurality of pieces of merchandise having the same merchandise name, the accompanying information recognition unit 140 recognizes a price of pieces of merchandise so that prices of the pieces of merchandise having the same name are the same, from among prices recognized for respective pieces of merchandise included in the captured image.

In FIG. 2, for example, three pieces of merchandise (referred to as Merchandise A) having A as a merchandise name are being sold. It is assumed that the accompanying information recognition unit 140 recognizes prices of the respective pieces of Merchandise A as "160 yen", "150 yen", and "160 yen". In this case, the accompanying information recognition unit 140 may repeat character recognition processing while changing a recognition parameter until all the prices of the three pieces of Merchandise A become the same. The accompanying information recognition unit 140 may determine a price with more recognized results as a price of pieces of merchandise. In the case of the above-described example, for example, a number recognized as "160 yen" for prices of pieces of the Merchandise A is two, and a number recognized as "150 yen" is one. Therefore, the accompanying information recognition unit 140 may recognize "160 yen" with a larger number of recognition as a price of the pieces of the Merchandise A. The accompanying information recognition unit 140 may recognize a result with a higher recognition score indicating a precision of a recognition result as a price of the merchandise. Thereby, it is possible for the vending machine recognition apparatus 100 to further enhance recognition accuracy of merchandise information.

It is preferable for the accompanying information recognition unit 140 to further recognize a sales situation of the merchandise from a peripheral image region of an image region of recognized merchandise. Merchandise being sold in a vending machine is frequently accompanied with information indicating cold merchandise (a character string of "COLD" in FIG. 3) or information indicating hot merchandise. The merchandise being sold may be accompanied with information indicating that merchandise is being sold or is sold out. The accompanying information recognition unit 140 recognizes a character string, a color, a shape, or the like indicating such a sales situation of merchandise. The accompanying information recognition unit 140 associates, as accompanying information, the recognized result with information indicating related merchandise.

Thereby, the vending machine recognition apparatus 100 may collect more pieces of merchandise information.

Further, for example, a label indicating a price of merchandise may be provided in a mode different from another label. In this case, the accompanying information recognition unit 140 preferably recognizes, as merchandise information, information indicating that the price of the merchandise is provided in a mode different from that of another piece of merchandise. This will be described with reference to FIG. 5.

Figure 5:
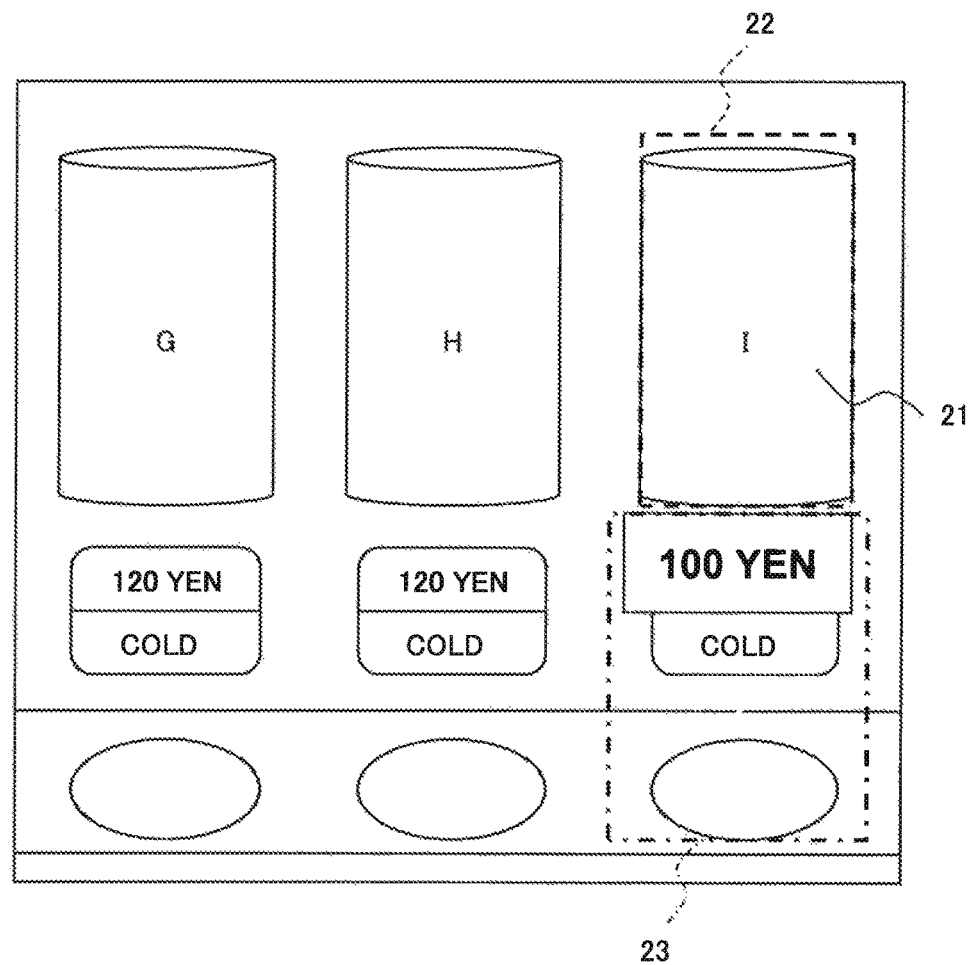
FIG. 5 is a diagram for illustrating one example of an operation of an accompanying information recognition unit in the first example embodiment of the present invention.

FIG. 5 is one example of an image obtained by partially enlarging the captured image illustrated in FIG. 2 and is a diagram for illustrating an operation of the accompanying information recognition unit 140. As illustrated in FIG. 5, Merchandise G and Merchandise H are being sold at 120 yen. Merchandise I is being sold at 100 yen, and a label indicating the "100 yen" is provided in a mode different from "120 yen" that is a label indicating the price of the Merchandise G and the Merchandise H. A character string indicating the price of the Merchandise I is written in a mode different from a character string indicating the price of the pieces of the Merchandise G and H. The mode of a character string indicates a type of a font and a font size.

The accompanying information recognition unit 140 recognizes whether a mode of a character string indicating a price of merchandise is the same as a mode of a character string indicating a price of another piece of merchandise. For example, with respect to the Merchandise I, the accompanying information recognition unit 140 recognizes that a mode of a character string of the Merchandise I is different from a mode of a character string indicating a price of another piece of merchandise. The accompanying information recognition unit 140 associates information indicating that the mode is in a different mode with information indicating the merchandise as accompanying information of the merchandise (merchandise information).

Thereby, the vending machine recognition apparatus 100 can collect, for example, information indicating that merchandise is the one that is intentionally priced-down and information indicating that merchandise is the one on sale.

As illustrated in FIG. 2 and FIG. 3, portions displaying prices of pieces of merchandise are generally disposed in a line in a vending machine. Based on the information, the setting unit 130 extracts, from the captured image, a portion of a line including portions indicating prices of pieces of merchandise. The setting unit 130 sets, as the recognition target region 23 of the merchandise, a region including the extracted portion of the line within a peripheral image region of the merchandise image region 22 of a certain piece of merchandise in the captured image.

In other words, it can be said that the setting unit 130 sets the recognition target region 23 for each piece of merchandise so that the recognition target regions 23 for respective pieces of merchandise are arranged in a predetermined line. In this manner, the setting unit 130 sets the recognition target region 23, and thereby the accompanying information recognition unit 140 executes character recognition from a smaller region. Thereby, the accompanying information recognition unit 140 may execute character recognition with a small quantity of calculation. A region subjected to character recognition is reduced, resulting in reduction of excessive information. Therefore, it is possible for the accompanying information recognition unit 140 to reduce erroneous recognition that a character string indicating the price is recognized in a region other than a region where a price is indicated.

The accompanying information recognition unit 140 may, for example, binarize the recognition target region 23 of a region included in the portion of the line and thereby more accurately extract a character string included in the recognition target region 23. Thereby, it is possible for the accompanying information recognition unit 140 to further enhance accuracy in character recognition.

The setting unit 130 may set the recognition target region 23 in order to allow the accompanying information recognition unit 140 to recognize information indicating a sales situation of merchandise from the recognition target region 23. The setting unit 130 may set the recognition target region 23 by separating the region into a region displaying a price of merchandise and a region indicating a sales situation of the merchandise. Thereby, it is possible for the vending machine recognition apparatus 100 to further enhance accuracy in collection of merchandise information.

The accompanying information recognition unit 140 may include information indicating a location where a vending machine selling the merchandise is installed, as accompanying information of information indicating recognized merchandise.

As described above, the vending machine recognition apparatus 100 can more favorably collect merchandise information of merchandise being sold. Therefore, by means of the vending machine recognition apparatus 100 according to the present example embodiment, it is possible to collect more useful information for marketing of merchandise.

Second Example Embodiment

A second example embodiment of the present invention will be described. In the present example embodiment, a minimum configuration for solving the problem of the present invention will be described.

Figure 6:
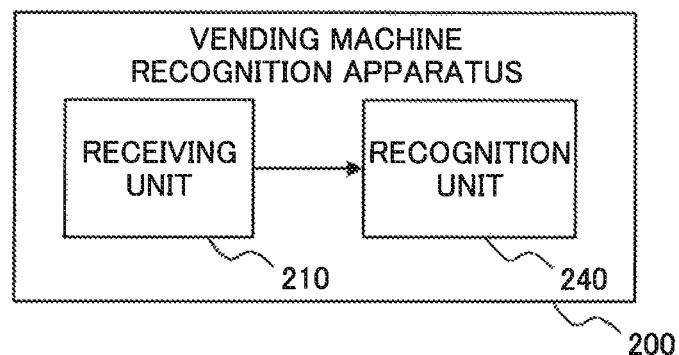
FIG. 6 is a function block diagram illustrating one example of a function configuration of a vending machine recognition apparatus according to a second example embodiment of the present invention.

FIG. 6 is a function block diagram illustrating one example of a function configuration of a vending machine recognition apparatus 200 according to the present example embodiment. The vending machine recognition apparatus 200 according to the present example embodiment includes a receiving unit 210 and a recognition unit 240, as illustrated in FIG. 6.

The receiving unit 210 is equivalent to the receiving unit 110 of the vending machine recognition apparatus 100 according to the above-described first example embodiment. Specifically, the receiving unit 210 is means configured to receive a captured image obtained by image-capturing a displayed object that is an object indicating merchandise. The object indicating merchandise is merchandise itself or a sample of merchandise, for example. In the same manner as the above-described receiving unit 110, the receiving unit 210 may receive a captured image directly from an imaging device or via a network, or may receive a captured image from a storage device on which captured images are accumulated.

The receiving unit 210 supplies the received captured image to the recognition unit 240.

The recognition unit 240 receives the captured image from the receiving unit 210. The recognition unit 240 recognizes merchandise included in the captured image. The recognition unit 240 recognizes a price of the merchandise from a peripheral image region of an image region of the recognized merchandise.

Thereby, it is possible for the vending machine recognition apparatus 200 according to the present example embodiment to more favorably collect merchandise information of merchandise being sold such as a price of the merchandise, as in the same manner as the vending machine recognition apparatus 100 according to the first example embodiment.

Third Example Embodiment

Next, a merchandise shelf recognition apparatus according to a third example embodiment will be described. In the first and second example embodiments, collection of merchandise information of merchandise being sold in a vending machine has been described, however, it is not limited thereto. In the present example embodiment, description will be made on collection of merchandise information of merchandise displayed on a merchandise shelf in a store, for example.

Figure 7:
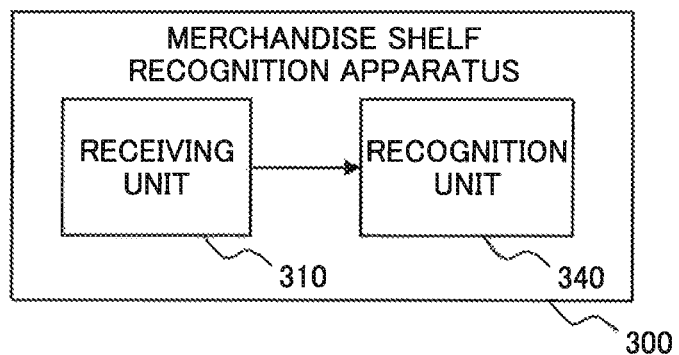
FIG. 7 is a function block diagram illustrating one example of a function configuration of a merchandise shelf recognition apparatus according to a third example embodiment of the present invention.

FIG. 7 is a function block diagram illustrating one example of a function configuration of a merchandise shelf recognition apparatus 300 according to the present example embodiment. The merchandise shelf recognition apparatus 300 according to the present example embodiment includes a receiving unit 310 and a recognition unit 340, as illustrated in FIG. 7.

The receiving unit 310 is means configured to receive a captured image obtained by image-capturing a display shelf where merchandise is displayed. In the same manner as the above-described receiving unit 110, the receiving unit 310 may receive a captured image directly from an imaging device or via a network, or may receive a captured image from a storage device on which captured images are accumulated. The receiving unit 310 supplies the received captured image to the recognition unit 340.

The recognition unit 340 receives the captured image from the receiving unit 310. The recognition unit 340 recognizes merchandise included in the captured image from the captured image. The recognition unit 340 recognizes a price of the merchandise from a peripheral image region of an image region of the recognized merchandise.

Figure 8:
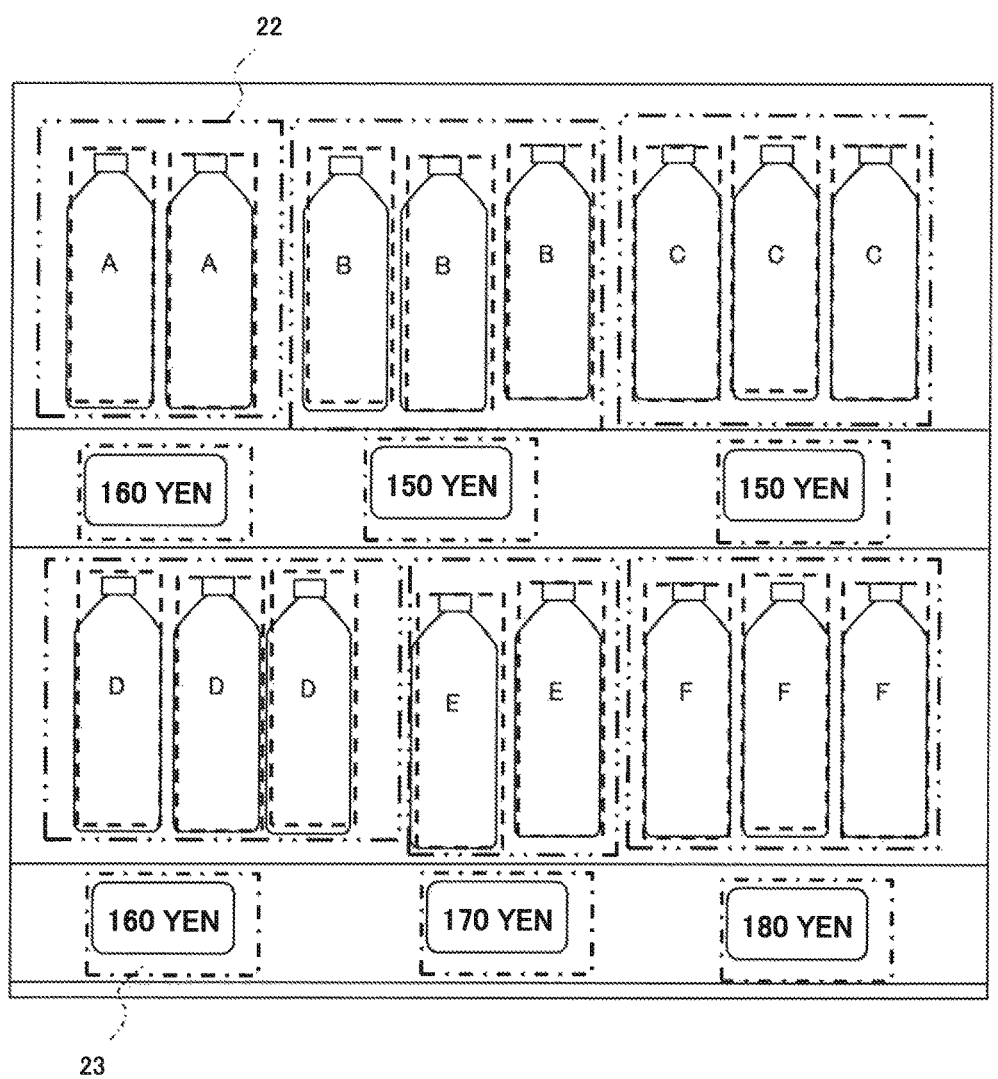
FIG. 8 is a diagram for illustrating an operation of a recognition unit in the third example embodiment of the present invention.

With reference to FIG. 8, one example of an operation of the recognition unit 340 will be described. FIG. 8 is a diagram for illustrating one example of the operation of the recognition unit 340 of the merchandise shelf recognition apparatus 300 according to the present example embodiment. The recognition unit 340 receives a captured image as illustrated in FIG. 8 from the receiving unit 310.

Of pieces of merchandise displayed on a merchandise shelf of a store, a label indicating a price for pieces of merchandise having the same merchandise name may be provided for each position where a piece of merchandise is displayed. Alternatively, the label may be provided collectively for pieces of merchandise having the same merchandise name. In the present example embodiment, the latter will be described as an example.

As illustrated in FIG. 8, it is assumed that a plurality of pieces of merchandise are displayed on a display shelf and there is provided a label indicating one price for pieces of merchandise having the same merchandise name. The recognition unit 340 first recognizes, from the captured image, pieces of merchandise included in the captured image. In FIG. 8, an image region of each piece of merchandise recognized on a captured image by the recognition unit 340 is illustrated by being surrounded by a dashed line.

The recognition unit 340 designates image regions of pieces of merchandise having the same name as one merchandise image region 22, as illustrated by being surrounded by a dashed double-dotted line in FIG. 8. The recognition unit 340 recognizes a price of the pieces of merchandise from a peripheral image region of the merchandise image region 22. At that time, the recognition unit 340 may set the recognition target region 23 for recognizing a price of merchandise in the same manner as the setting unit 130 in the first example embodiment. In FIG. 8, an example of the recognition target region 23 set by the recognition unit 340 is illustrated by being surrounded by a dashed dotted line. In this manner, the recognition unit 340 preferably recognizes a price of related merchandise from the recognition target region 23.

Information indicating that only one label indicating a price is provided for pieces of merchandise having the same merchandise name may be stored in a storage device such as the storage unit 160 described in the first example embodiment, as merchandise shelf information, for example. In the same manner as the vending machine condition information described in the first example embodiment, the merchandise shelf information may include information indicating a condition relating to a price of merchandise being sold on a merchandise shelf. In addition, the merchandise shelf information may include information relating to a condition where there is a character string, below merchandise, indicating a price of the merchandise. The recognition unit 340 may execute recognition processing based on these pieces of information.

In this manner, the merchandise shelf recognition apparatus 300 may include the same function as the function included in the vending machine recognition apparatus 100 according to the above-described first example embodiment.

When a peripheral image region of the merchandise image region 22 of merchandise includes a POP (point of purchase) advertisement describing the merchandise, the recognition unit 340 recognizes the POP advertisement. The recognition unit 340 recognizes information indicating that a POP advertisement is provided and/or information indicating a content of the POP advertisement as merchandise information of related merchandise. Thereby, it is possible for the merchandise shelf recognition apparatus 300 to collect, from a captured image, merchandise information that recognized merchandise is provided with a POP advertisement.

Thereby, it is possible for the merchandise shelf recognition apparatus 300 according to the present example embodiment to more favorably collect merchandise information of merchandise being displayed (being sold), in the same manner as the above-described vending machine recognition apparatus.

Fourth Example Embodiment

Figure 9:
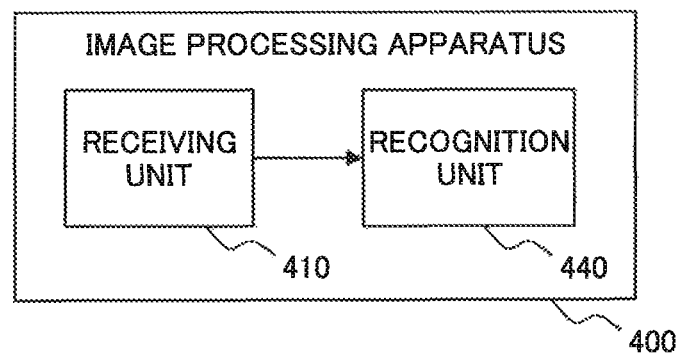
FIG. 9 is a function block diagram illustrating one example of a function configuration of an image processing apparatus according to a fourth example embodiment of the present invention.

Next, an image processing apparatus according to a fourth example embodiment of the present invention will be described. The image processing apparatus according to the present example embodiment is an apparatus functioning as a base of the vending machine recognition apparatuses (100 and 200) according to the above-described first and second example embodiments and the merchandise shelf recognition apparatus 300 according to the third example embodiment. FIG. 9 is a function block diagram illustrating one example of a function configuration of an image processing apparatus 400 according to the present example embodiment. The image processing apparatus 400 according to the present example embodiment includes a receiving unit 410 and a recognition unit 440, as illustrated in FIG. 9.

The receiving unit 410 is means configured to receive a captured image obtained by capturing an image of an object being displayed and indicating merchandise. The object indicating merchandise refers to merchandise itself or a sample of merchandise, for example. In the same manner as the above-described receiving unit 110, the receiving unit 410 may receive a captured image directly from an imaging device or via a network, or may receive a captured image from a storage device on which captured images are accumulated.

The captured image may be an image obtained by image-capturing a vending machine or may be an image obtained by image-capturing, for example, a display shelf in a store. The receiving unit 410 supplies the received captured image to the recognition unit 440.

The recognition unit 440 receives the captured image from the receiving unit 410. The recognition unit 440 recognizes merchandise included in the captured image from the captured image. The recognition unit 440 recognizes accompanying information of the merchandise from a peripheral image region of an image region of the recognized merchandise. The accompanying information of merchandise refers to information associated with merchandise and information including information indicating, for example, a price of the merchandise and a situation where the merchandise is being sold. As described in the first example embodiment, the accompanying information in the present example embodiment is one example of merchandise information.

The image processing apparatus 400 according to the present example embodiment may include the same function as the function included in the vending machine recognition apparatus 100 according to the above-described first example embodiment.

Thereby, it is possible for the image processing apparatus 400 according to the present example embodiment to more favorably collect merchandise information of merchandise being sold, in the same manner as the above-described vending machine recognition apparatuses and merchandise shelf recognition apparatus.

<Example of Hardware Configuration>

A description will be made on an example of hardware configuration capable of realizing the vending machine recognition apparatuses (100 and 200), the merchandise shelf recognition apparatus 300, and the image processing apparatus 400 according to the above-described example embodiments. The above-described vending machine recognition apparatuses (100 and 200), merchandise shelf recognition apparatus 300, and image processing apparatus 400 may each be realized as a dedicated device, or may be realized using a computer (an information processing device).

Figure 10:
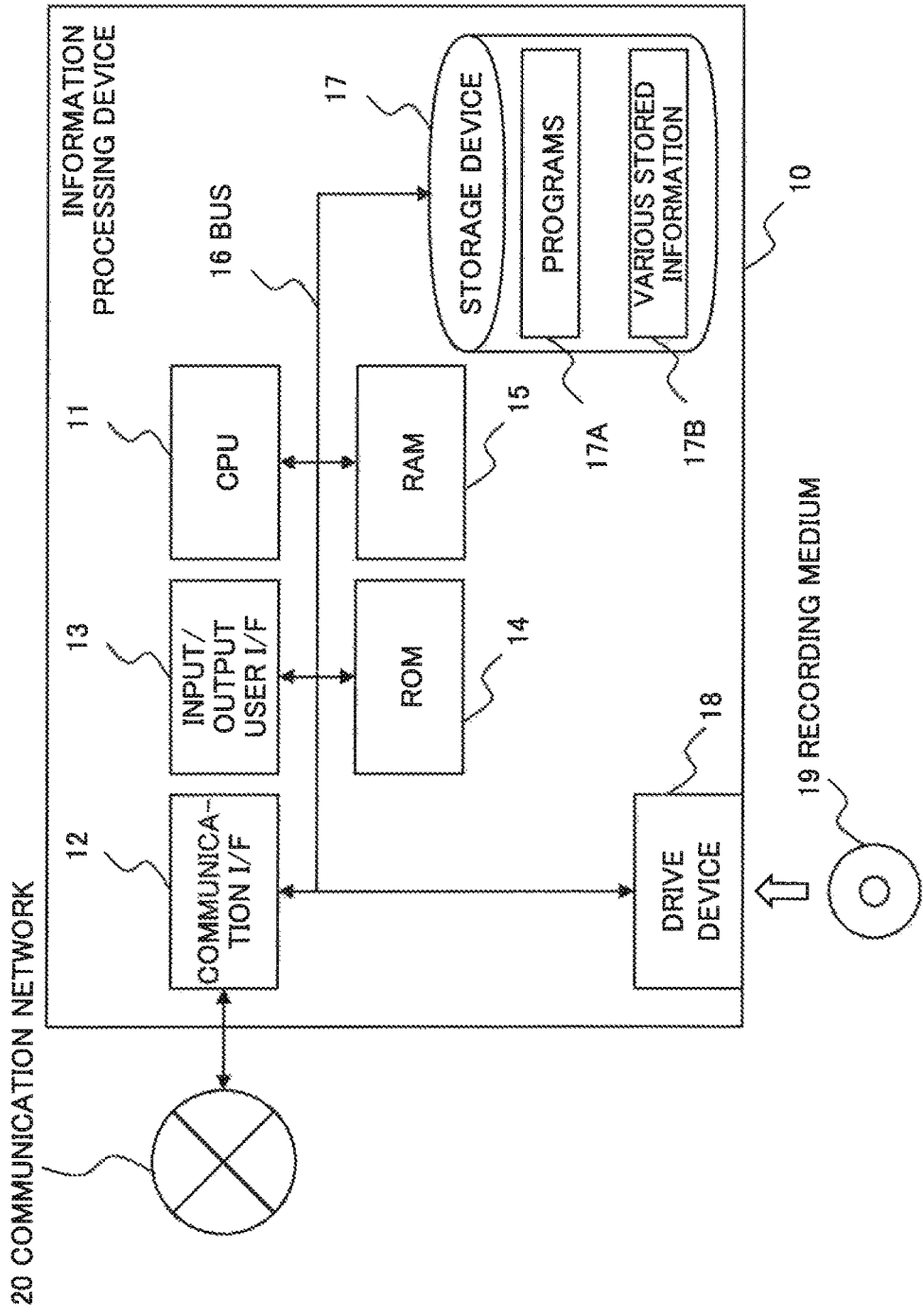
FIG. 10 is a diagram exemplarily illustrating a hardware configuration of a computer (an information processing device) capable of realizing the example embodiments of the present invention.

FIG. 10 is a diagram exemplarily illustrating a hardware configuration of a computer (an information processing device) capable of realizing the example embodiments of the present invention.

Hardware of an information processing device (computer) 10 illustrated in FIG. 10 includes the following members:
- a CPU (Central Processing Unit) 11;
- a communication interface (I/F) 12;
- an input/output user interface 13;
- a ROM (Read Only Memory) 14;
- a RAM (Random Access Memory) 15;
- a storage device 17; and
- a drive device 18 of a computer-readable recording medium 19.

These members are connected via a bus 16. The input/output user interface 13 is a man-machine interface such as a keyboard that is one example of an input device and a display as an output device. The communication interface 12 is general communication means in order for the apparatuses (FIG. 1, FIG. 6, FIG. 7, and FIG. 9) according to the above-described example embodiments to communicate with an external device via a communication network 20. In the hardware configuration, the CPU 11 controls the entire operation for the information processing device 10 that realizes the vending machine recognition apparatuses (100 and 200), the merchandise shelf recognition apparatus 300, and the image processing apparatus 400 according to the example embodiments.

The above-described example embodiments are realized by supplying a program (a computer program) capable of realizing the processing described in the example embodiments to the information processing device 10 illustrated in FIG. 10, loading the program into the CPU 11, and executing the program, for example. The program may be a program capable of realizing various types of processing described in the flowchart (FIG. 4) referred to in the description of the example embodiments or the units (the blocks) illustrated in the apparatuses in the block diagrams illustrated in FIG. 1, FIG. 6, FIG. 7, and FIG. 9, for example.

The program supplied into the information processing device 10 may be stored in a readable/writable transitory storage memory (15) or a non-volatile storage device (17) such as a hard disk drive. That is, in the storage device 17, programs 17A is a program capable of realizing the functions of the units illustrated in the vending machine recognition apparatuses (100 and 200), the merchandise shelf recognition apparatus 300, and the image processing apparatus 400, for example, according to the above-described example embodiments. Various stored information 17B may include, for example, a captured image, location information of a vending machine, information for recognizing merchandise, character data, vending machine condition information, and merchandise information in the above-described example embodiments. However, upon implementing the programs on the information processing device 10, a configuration unit of an individual program module is not limited to the division of the blocks illustrated in the block diagrams (FIG. 1, FIG. 6, FIG. 7, and FIG. 9) but may be selected as appropriate by a person skilled in the art upon the implementation.

In addition, in the cases described above, procedures widely available as of now as listed below can be used to provide the programs to the apparatus:
- a method for installing into the apparatus via any of various computer-readable recording media (19) such as a CD (Compact Disc)-ROM and a flash memory; and
- a method for downloading from the outside via a communication line (20) such as the Internet.

In such a case, it is conceivable that the example embodiments of the present invention are configured by codes configuring the computer program (the programs 17A) or the recording medium (19) storing the codes.

The present invention has been described as examples in which the present invention is applied to the above-described example embodiments. However, the technical scope of the present invention is not limited to the scopes described in the above-described example embodiments. It is apparent to those skilled in the art that various types of modifications and improvements can be added to the example embodiments. In such cases, new example embodiments added with the modifications or improvements may also be included in the technical scope of the present invention. This is obvious from the statements in the appended claims.

This application is based upon and claims the benefit of priority from Japanese Patent Application No. 2014-214754, filed on Oct. 21, 2014, the entire disclosure of which is incorporated herein.

REFERENCE SIGNS LIST

100 Vending machine recognition apparatus
111 Receiving unit
120 Merchandise recognition unit
130 Setting unit 140 Accompanying information recognition unit (recognition unit)
160 Storage unit
200 Vending machine recognition apparatus
210 Receiving unit
240 Recognition unit
300 Merchandise shelf recognition apparatus
310 Receiving unit
340 Recognition unit
400 Image processing apparatus
410 Receiving unit
440 Recognition unit
21 Merchandise sample
22 Merchandise image region
23 Recognition target region

The invention claimed is:

1. A merchandise shelf recognition apparatus comprising:
a memory storing instructions; and
a processor configured to execute instructions to:
receive a captured image obtained by capturing an image of a merchandise shelf;
recognize merchandise from the captured image;
recognize a price of the merchandise from a peripheral image region of the recognized merchandise;
recognize different prices for a plurality of same pieces of merchandise; and
repeat recognizing the price of the merchandise while changing a recognition parameter until the plurality of same pieces of merchandise have the same price.

2. The merchandise shelf recognition apparatus according to claim 1,
wherein the processor is further configured to execute instructions to recognize, when recognized letters are arranged in a predetermined line, numbers included in the predetermined line as a character string indicating a price of the merchandise.

3. The merchandise shelf recognition apparatus according to claim 1,
wherein the processor is further configured to execute instructions to recognize a price of the merchandise based on information relating to a price range of merchandise being sold in the vending machine, and repeat recognizing a price of the merchandise when it is determined that the price of the merchandise is not included in the price range.

4. The merchandise shelf recognition apparatus according to claim 1,
wherein the processor is further configured to execute instructions to recognize a sale situation of the merchandise from the peripheral image region of the image region of the recognized merchandise.

5. The merchandise shelf recognition apparatus according to claim 1,
wherein the processor is further configured to execute instructions to recognize whether a mode of a character string indicating a price of the merchandise is same as a mode of a character string indicating a price of another piece of merchandise.

6. The merchandise shelf recognition apparatus according to claim 1, wherein the processor is further configured to execute instructions to:
set the peripheral image region of the image region of the recognized merchandise on the captured image as a recognition target region where a price of the merchandise is recognized based on a predetermined condition, and
recognize a price of the merchandise from the recognition target region.

7. The merchandise shelf recognition apparatus according to claim 6,
wherein the processor is further configured to execute instructions to set a recognition target region for recognizing a price of the merchandise based on a condition that information indicating a price of the merchandise is included below the image region of the recognized merchandise.

8. The merchandise shelf recognition apparatus according to claim 6,
wherein the processor is further configured to execute instructions to set the recognition target region for each of the pieces of merchandise so that recognition target regions for respective pieces of merchandise arranged in a predetermined line.

9. The merchandise shelf recognition apparatus according to claim 6,
wherein the processor is further configured to execute instructions to recognize a sales situation of the merchandise from the recognition target region.

10. The merchandise shelf recognition apparatus according to claim 1,
wherein the processor is further configured to execute the instructions to determine the plurality of same pieces of merchandise are included in the captured image.

11. A merchandise shelf recognition method comprising:
receiving a captured image obtained by capturing an image of a merchandise shelf;
recognizing merchandise from the captured image;
recognizing a price of the merchandise from a peripheral image region of the recognized merchandise; and
recognizing different prices for a plurality of same pieces of merchandise; and
repeat recognizing the price of the merchandise while changing a recognition parameter until the plurality of same pieces of merchandise have the same price.

12. A computer-readable non-transitory recording medium storing a program that causes a computer to execute:
processing for receiving a captured image obtained by capturing an image of a merchandise shelf;
processing for recognizing merchandise from the captured image and recognizing a price of the merchandise from a peripheral image region the recognized merchandise;
processing for recognizing different prices for a plurality of same pieces of merchandise; and
processing for repeating recognizing the price of the merchandise while changing a recognition parameter until the plurality of same pieces of merchandise have the same price.

* * * * *